Aug. 19, 1952     C. A. KUMINS     2,607,705
INORGANIC PIGMENT
Filed May 26, 1949
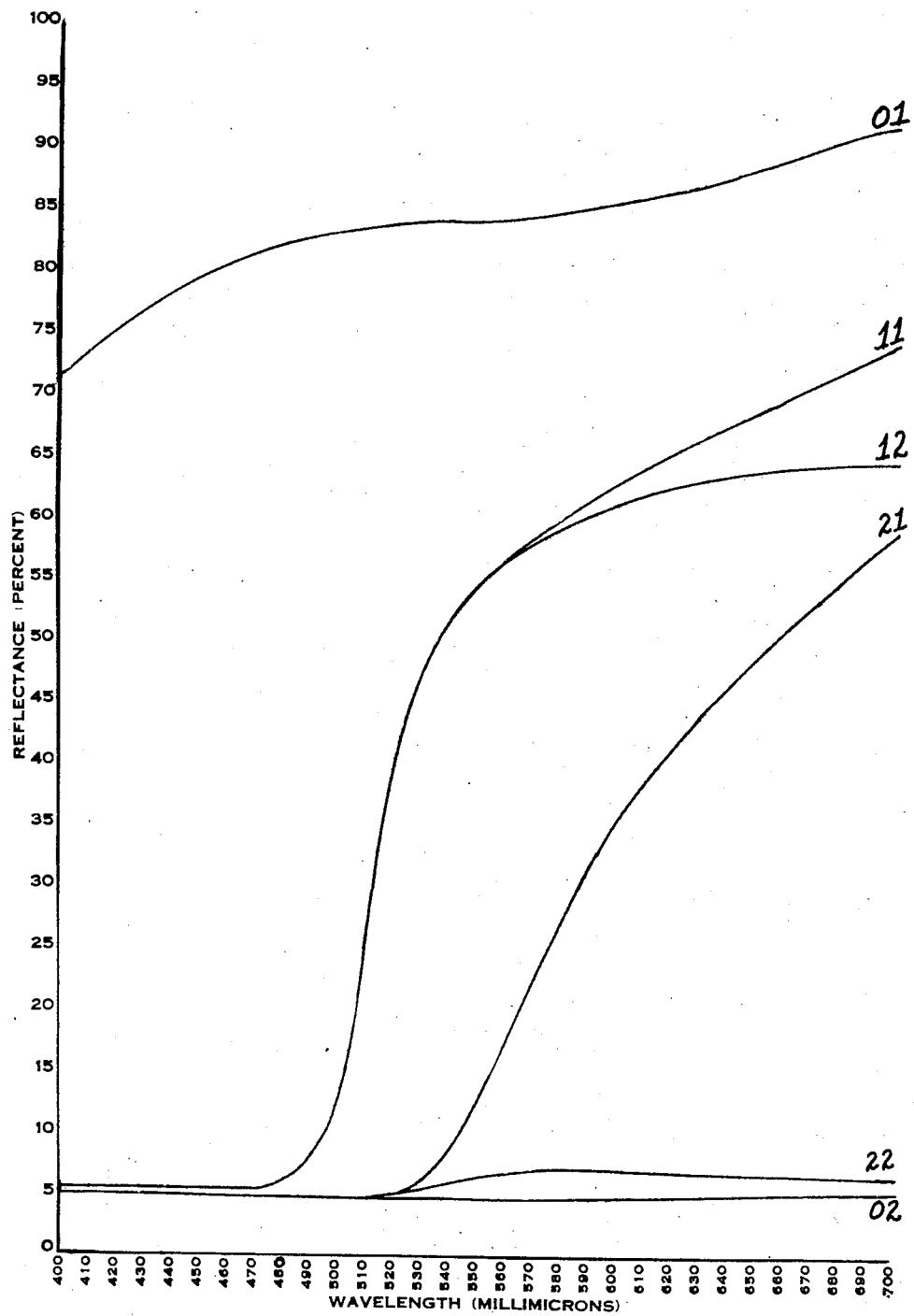
Charles A. Kumins
by Theodore Post
Agent Patented Aug. 19, 1952

2,607,705

UNITED STATES PATENT OFFICE 2,607,705

INORGANIC PIGMENT

Charles A. Kumins, Tuckahoe, N. Y., assignor to Interchemical Corporation, New York, N. Y., a corporation of Ohio Application May 26, 1949, Serial No. 95,416

4 Claims. (Cl. 106—301)

This invention relates to cadmium sulfide pigments, and aims to provide transparent golden yellow cadmium sulfide pigments of great beauty, and transparent golden yellow compositions containing such pigments.

Cadmium sulfide pigments as usually produced are well known as high hiding or opaque pigments having a color range from orange to greenish yellow, the color being dependent upon the method of reacting the intermediates used in their preparation, temperature of calcination, and the presence or absence of coprecipitated zinc sulfide or barium sulfate, among other things, the zinc sulfide giving a lighter, greener shade, the barium sulfate giving an orange shade pigment. Cadmium sulfide pigments as usually produced have good hiding power, tinting strength, light resistance, heat resistance, and resistance to alkalies and acids. While they are expensive, still they have been used in lithographic and color-printing because they have the physical properties just enumerated.

The two main factors influencing the hiding power or opacity of a pigment are (1) particle size; and (2) difference in index of refraction between vehicle and pigment. While it was known that the hiding power or opacity of cadmium sulfide pigments could be varied to a limited extent by varying particle size, the refractive index range of cadmium sulfide pigments being 2.506 to 2.529, relatively unchangeable, led to the belief that cadmium sulfide pigments are inherently high hiding or opaque pigments. It is not surprising, therefore, that the art is devoid of any reference to completely transparent cadmium sulfide pigments.

I have discovered that transparent, brilliant golden yellow cadmium sulfide pigments can be prepared by controlling the particle size of the cadmium sulfide within the range of 0.01 to 0.05 micron, the average particle size being 0.02 micron. This is accomplished by:

1. Employing dilute solutions of reactants.
2. Reacting at relatively low temperatures.
3. Rapid precipitation with vigorous agitation.
4. Rapid separation of the precipitated cadmium sulfide from the mother liquor.
5. Eliminating the calcination process which causes crystal growth.

In order to prepare transparent cadmium sulfide, it is necessary to use dilute solutions of reactants. The lower concentration limits approach infinite dilution, consistent with obtaining satisfactory pigments but inconsistent with profitable commercial practice. The maximum allowable concentration before a diminution of transparency occurs is 2.3 moles per liter of either reactant, cadmium salt or sulfide, or a final cadmium sulfide concentration of approximately 110 grams per liter. I prefer to use aqueous solutions of cadmium salts varying between 0.195 molar to 2.3 molar, plus 5% excess sulfide to insure complete reaction with the more expensive cadmium salt.

Again, temperature at precipitation is kept relatively low, to promote small particle size formation. Above 90° C., larger particle size formation is promoted, so that transparency begins to diminish. The lower temperature limit is the freezing point of the reaction medium. My preferred temperature range is 10° to 90° C.

Rapid precipitation and vigorous agitation also contribute to the formation of fine particle size transparent CdS. The cadmium salt solution is added to the alkali sulfide solution or vice versa in a matter of several minutes during agitation sufficient to give or approach turbulent flow of the reaction medium, precipitated particles being kept in motion until filtration.

Particle size growth is prevented by rapid separation of the precipitated CdS from the reaction medium, as by filtering the precipitate within several minutes after precipitation is complete.

Since it was found that calcination causes sufficient crystal growth to give larger opaque particles, I do not calcine my products. Instead, slurries or pulps of my pigments are treated physically to transfer the hydrophobic particles to hydrophobic vehicles, such as plasticizers or film-forming vehicles, as by flushing.

The following examples are given for purposes of illustration.

Example 1

To 2 gals. of a 0.195 molar solution of CdSO₄ was added with high-speed stirring 1.05 gals. 0.39 molar solution of Na₂S.9H₂O, the reaction medium being at 10° C. After precipitation was completed, the stirring was continued for 1 minute, the slurry was filtered, and subjected to a pressure of about 5,000 p. s. i. in a press to reduce the moisture content of the pulp from 83% to 65%. The pressed cake was mixed with an equal weight (dry pigment basis) of a linseed oil modified glycerol phthalate oxidizing type resin and flushed in a dough mixer by mixing therein for 30 minutes. The small amount of residual moisture was removed by passing the CdS-alkyd resin mixture over a 3-roll ink mill. When particles from the CdS pulp were examined under the electron microscope, the average particle size was found to be 0.02 micron, with no particles larger than 0.05 micron. This compares with an average particle size of 0.4 micron for a representative commercial cadmium sulfide pigment.

Example 2

Two gals. of 0.197 molar $CdCl_2.2\frac{1}{2}H_2O$, at 10° C. was added to 1 gal. of 0.394 molar $Na_2S.9H_2O$ at the same temperature with vigorous agitation over a 5 minute period. Agitation of the CdS slurry was continued for an additional minute, after which it was filtered, washed free of sodium chloride, and flushed into castor oil, using the method of Example 1. The physical properties of the pigment in the pulp were similar to those of Example 1.

Example 3

Two gals. of 1.15 molar $CdSO_4$ at 25° C. was added to 1 gal. of 2.3 molar $Na_2S.9H_2O$ of the same temperature over an interval of several minutes, with intensive high-speed stirring. After precipitation was complete, the stirring was continued for an additional minute, the CdS slurry then being filtered, washed free of sodium sulfate, and flushed into the alkyd vehicle of Example 1. Finishes prepared therefrom were slightly hazy, and had less brilliance and transparency than the products of Examples 1 and 2.

Example 4

A solution of 56.7 lbs. $Na_2S.9H_2O$ in water (24 gals.) at 35° C. was reacted by rapid addition thereto of an aqueous solution of 53.4 lbs. $CdCl_2.2\frac{1}{2}H_2O$ in 72 gals. of water of the same temperature with vigorous high-speed stirring. Agitation was continued for 1 minute after all the cadmium had been added, the precipitated pigment was then filtered, and flushed into an alkyd resin solution. Films therefrom dried to a brilliant transparent gold finish.

Example 5

An aqueous solution of 534 grams $CdCl_2.2\frac{1}{2}H_2O$ in 12 liters of water at 15° C. was added rapidly with vigorous agitation to an aqueous solution of 568 grams $Na_2S.9H_2O$ in 6 liters of water at the same temperature. Thereafter agitation was continued for 1 minute, the slurry of CdS was filtered, and the pigment washed free of water soluble salts. The ultimate pigment particles averaged 0.02 micron, within the transparent particle size range. The 35% solids pulp thereof was stable at room temperature over a period of three months.

Example 6

A cold solution of 25 gals. $Na_2S.9H_2O$ was made up to a 0.65 molar concentration, and to it was added 50 gals. of a cold 0.325 molar solution of $CdCl_2.2\frac{1}{2}H_2O$. The remainder of the procedure as in Example 1 was followed, and similar products were obtained.

Example 7

Two hundred gals. of an aqueous 0.195 molar solution of $CdSO_4$ was rapidly added to 100 gals. of an aqueous 0.39 molar solution of $Na_2S.9H_2O$, both solutions being heated to 80° C. with vigorous agitation. One minute thereafter, the slurry was filtered, washed free of sodium sulfate, and the 17% solids CdS pulp stored at room temperature for three months. The particles then were still in the transparent particle size range of 0.01–0.05 micron, averaging 0.02 micron. Equivalent results were obtained when potassium sulfide was substituted for sodium.

Example 8

Cadmium sulfide pigment was made under the following reaction conditions:

| | $CdCl_2$ Soln. | $Na_2S$ Soln. | Temp. Pptn. | Addition | Result |
|---|---|---|---|---|---|
| | Mol | Mol | °C. | | |
| 1 | 0.197 | 0.394 | 90 | Rapid | Hazy. |
| 2 | 3.0 | 3.0 | 5 | do | Opaque. |
| 3 | 3.0 | 3.0 | 90 | do | More opaque than 2. |
| 4 | 2.3 | 1.15 | 5 | do | Very hazy. |
| 5 | 0.197 | 0.394 | 20 | Dropwise | Very slight haze. |
| 6 | 0.197 | 0.394 | 90 | do | Slight haze. |
| 7 | ¹0.197 | 0.394 | 20 | Rapid | Transparent. |
| 8 | 0.394 | 0.197 | 20 | do | Do. |

¹ Plus 10% excess cadmium chloride solution.

Rapid addition is completed within several minutes.

Example 9

A brilliant transparent golden enamel was made up as follows:

| Ingredient | Percent by Weight |
|---|---|
| 50% dispersion of pigment of Example 1 in alkyd resin disclosed in Example 1 | 9.4 |
| Alkyd resin of Example 1 | 14.0 |
| 50% alkyd resin in Hi Flash Naptha | 70.0 |
| Naphthenate drier (0.01% each cobalt, manganese and lead) | 6.6 |
| Total | 100.0 |

The ingredients were simply stirred together until uniform, the drier being added last.

Example 10

A brilliant transparent golden roller coating finish was prepared as follows:

| Ingredient | Percent by Weight |
|---|---|
| 20% dispersion of pigment of Example 1 in alkyd of Example 1 | 23.5 |
| 50% solution maleated ester gum-maleated linseed oil-bodied linseed oil in varnolene-kerosene (7:3) | 75.5 |
| Drier, as in Example 8 | 1.0 |
| Total | 100.0 |

The drier was added to the uniform mixture of the other ingredients.

Example 11

A brilliant transparent golden lacquer was formulated as follows:

| Ingredient | Percent by Weight |
|---|---|
| Lacquer, 30% nitrocellulose in toluene, butyl acetate and methyl ethyl ketone | 90.2 |
| 3:3:1 Castor oil-pigment paste of Example 2 | 7.2 |
| Dibutyl phthalate | 2.6 |
| Total | 100.0 |

The ingredients were stirred together until uniform.

Example 12

Instead of flushing my pigments as disclosed in Examples 1 and 2, add the vehicle in which the cadmium sulfide is to be flushed directly to the reaction kettle upon completion of precipitation and reflux the whole mass until the vehicle has thoroughly wet the cadmium sulfide, decant the water, and remove traces of water by passing the pigment dispersion over a 3-roller ink mill.

*Example 13*

Another method of transferring my pigments to a hydrophobic vehicle is to mix the washed pulp with an equal weight of flushing vehicle, pouring the entire mass into a high-speed mixer, and flushing therein. A small amount of wetting agent may be added, but is not strictly necessary since my pigments are hydrophobic. Traces of water are removed by passing the pigment dispersion over a 3-roller ink mill.

*Example 14*

A 50% solution of transparent Utah-type coal resin in low-solvency petroleum solvent having a 5-95% boiling range of 245-259° C., and a kauri-butanol value of 26, was pigmented with 25% transparent cadmium sulfide pigment by flushing pigment pulp therein. An equivalent amount of commercial cadmium sulfide pigment was mixed into the same amount of the same resin vehicle, so that this standard and the above-mentioned dispersion of transparent pigment could be evaluated for hiding power.

In evaluating for hiding power, test paper composed of alternate black and white areas is used. When a film containing a high hiding pigment is drawn over these test areas, the spectral curve should approach that of the pigment as the underlying layer becomes covered by the colorant. On the other hand, a transparent material will not obliterate the spectral characteristics of the underlying areas in the black region (absorption of all transmitted light), but will contribute its chromophoric individuality to the white area (reflection of all transmitted light).

The figure illustrates the spectral properties of the alternate white and black test areas, 01 and 02, the effect on each of standard cadmium sulfide pigmented composition, 11 and 12, and the effect on each of my transparent cadmium sulfide pigmented composition, 21 and 22. In each case a film thickness of 0.004 inch was applied. It is apparent that the high-hiding or opaque standard composition spectral curves, 11 and 12, approach that of the pigment; whereas the spectral curves for my transparent composition, 21 and 22, even with films as thick as 0.004 inch, show that the reflectance characteristics of the black test area, 02, have hardly been affected, those of the white area, 01, exhibiting the effect of the yellow colorant to the extent shown at 21.

I claim:

1. Method of preparing a transparent cadmium sulfide pigment comprising rapidly reacting a solution of a water soluble cadmium salt not exceeding 2.3 molar concentration with a solution of a water soluble alkali sulfide not exceeding 2.3 molar concentration at temperature not exceeding 90° C., separating the precipitated cadmium sulfide from the reaction medium and preventing the growth of pigmentary aggregates, by transferring the pigment particles to a hydrophobic vehicle.

2. Cadmium sulfide consisting essentially of particles having an average particle size of 0.02 micron and having no particles larger than 0.05 micron, such particles yielding transparent golden yellow films when used to pigment organic film-forming coating compositions and having a negligible opacity as measured by the reflectance characteristics of such a film applied over a standard black background, the percent reflectance of such pigmented film not exceeding 2% more than the reflectance of the uncovered standard black background throughout the visible spectrum, prepared by the method of claim 1.

3. A cadmium sulfide pigment pulp having particles averaging 0.02 micron particle diameter, with no particles larger than 0.05 micron, such particles yielding transparent golden yellow films when used to pigment organic film-forming coating compositions and having a negligible opacity as measured by the reflectance characteristics of such a film applied over a standard black background, the percent reflectance of such pigmented film not exceeding 2% more than the reflectance of the uncovered standard black background throughout the visible spectrum, prepared by the method of claim 1.

4. A transparent golden yellow organic film-forming coating composition pigmented with cadmium sulfide pigment having an average particle size of 0.02 micron, with no particles larger than 0.05 micron, prepared by the method of claim 1.

CHARLES A. KUMINS.

REFERENCES CITED

The following references are of record in the file of this patent:

UNITED STATES PATENTS

| Number | Name | Date |
| --- | --- | --- |
| 1,662,999 | Cabot | Mar. 20, 1928 |
| 2,061,368 | O'Brien | Nov. 17, 1936 |
| 2,237,311 | O'Brien | Apr. 8, 1941 |
| 2,406,472 | Nerlinger | Aug. 27, 1946 |

OTHER REFERENCES

"Outlines of Paint Technology," Heaton Griffin & Co., Ltd., London, 1947, pg. 17.